US011085686B2

United States Patent
Schumacher et al.

(10) Patent No.: US 11,085,686 B2
(45) Date of Patent: Aug. 10, 2021

(54) METHODS AND SYSTEMS FOR PREVENTING PREMATURE COMPRESSOR FAILURE FROM IMPROPER OPERATION

(71) Applicant: THERMO KING CORPORATION, Minneapolis, MN (US)

(72) Inventors: Ryan Wayne Schumacher, Bloomington, MN (US); Russell L. Sanders, Minnetonka, MN (US); Michael James Vanous, Minneapolis, MN (US); Marcelo Andrade Dias, Lakeville, MN (US)

(73) Assignee: Thermo King Corporation, Minneapolis, MN (US)

( * ) Notice: Subject to any disclaimer, the term of this patent is extended or adjusted under 35 U.S.C. 154(b) by 0 days.

(21) Appl. No.: 16/716,048

(22) Filed: Dec. 16, 2019

(65) Prior Publication Data

US 2020/0116406 A1 Apr. 16, 2020

Related U.S. Application Data (63) Continuation of application No. 15/589,545, filed on May 8, 2017, now Pat. No. 10,520,234.

(51) Int. Cl.
*F25B 49/02* (2006.01)
*F25B 49/00* (2006.01)
(Continued)

(52) U.S. Cl.
CPC ............ *F25B 49/022* (2013.01); *F04B 49/06* (2013.01); *F04B 49/10* (2013.01); *F04C 28/04* (2013.01);
(Continued)

(58) Field of Classification Search
CPC ...... F04B 2207/70; F04B 49/06; F04B 49/10; F04C 2270/72; F04C 28/06; F04C 28/28;
(Continued)

(56) References Cited

U.S. PATENT DOCUMENTS 3,799,692 A * 3/1974 Shields ............... F04D 27/0292
 415/118
4,969,801 A 11/1990 Haseley et al.
(Continued)

FOREIGN PATENT DOCUMENTS

| CN | 105486969 | 4/2016 |
|---|---|---|
| CN | 105743065 | 7/2016 |
| WO | 2015003482 | 1/2015 |

*Primary Examiner* — Henry T Crenshaw
(74) *Attorney, Agent, or Firm* — Hamre, Schumann, Mueller & Larson, P.C.

(57) ABSTRACT

Methods and systems for detecting and correcting improper operation of a compressor in a refrigeration system and/or an HVAC system include a component level detection and prevention and a system level detection and prevention. The system level detection and prevention can be a backup or a confirmation of the component level detection and prevention. The component level detection and prevention can detect and prevent improper compressor operation within a predetermined time so that the compressor's operation period in an improper direction can be minimized, thereby minimizing wear and damage to the compressor.

11 Claims, 6 Drawing Sheets

(51) Int. Cl.
*F04B 49/10* (2006.01)
*F04C 28/28* (2006.01)
*F04D 27/02* (2006.01)
*F04B 49/06* (2006.01)
*F04C 28/04* (2006.01)
*F04C 28/06* (2006.01)
*F04D 15/02* (2006.01)
*F04C 18/356* (2006.01)
*F04D 15/00* (2006.01)
*F04C 18/16* (2006.01)
*F04C 18/02* (2006.01)

(52) U.S. Cl.
CPC .............. *F04C 28/06* (2013.01); *F04C 28/28* (2013.01); *F04D 15/0254* (2013.01); *F04D 27/0292* (2013.01); *F25B 49/005* (2013.01); *F04B 2203/0207* (2013.01); *F04B 2207/70* (2013.01); *F04C 18/0215* (2013.01); *F04C 18/16* (2013.01); *F04C 18/356* (2013.01); *F04C 2240/81* (2013.01); *F04C 2270/03* (2013.01); *F04C 2270/72* (2013.01); *F04C 2270/78* (2013.01); *F04D 15/0094* (2013.01); *F25B 2400/08* (2013.01); *F25B 2500/06* (2013.01); *F25B 2500/26* (2013.01); *F25B 2600/0253* (2013.01); *F25B 2700/151* (2013.01); *F25B 2700/193* (2013.01); *F25B 2700/2115* (2013.01); *F25B 2700/2116* (2013.01); *F25B 2700/2117* (2013.01)

(58) Field of Classification Search
CPC ... F04C 2500/26; F04C 49/005; F04C 49/022
See application file for complete search history.

(56) References Cited

U.S. PATENT DOCUMENTS

| | | |
|---|---|---|
| 5,196,798 A | 3/1993 | Baeza et al. |
| 5,820,349 A | 10/1998 | Caillat |
| 6,210,119 B1 | 4/2001 | Lifson et al. |
| 2004/0210419 A1* | 10/2004 | Wiebe .................. F25B 49/005 702/182 |
| 2005/0196285 A1* | 9/2005 | Jayanth .................... H02H 7/08 417/44.11 |
| 2005/0217060 A1* | 10/2005 | Piccirillo ................ F28G 15/06 15/316.1 |
| 2006/0049795 A1* | 3/2006 | Iura ........................ H02P 1/029 318/807 |
| 2006/0272343 A1* | 12/2006 | Takahashi ............ B60H 1/3208 62/230 |
| 2006/0275145 A1 | 12/2006 | Takahashi et al. |
| 2007/0180841 A1 | 8/2007 | Bae et al. |
| 2008/0134715 A1 | 6/2008 | Lewis et al. |
| 2008/0288185 A1 | 11/2008 | Sawada et al. |
| 2009/0101094 A1 | 4/2009 | Mashiki et al. |
| 2009/0140745 A1* | 6/2009 | Williams ........... G01R 31/2829 324/522 |
| 2014/0260343 A1* | 9/2014 | Rite ....................... F04C 28/28 62/56 |
| 2015/0377536 A1 | 12/2015 | West et al. |
| 2016/0169572 A1* | 6/2016 | Noboa .................... F25B 13/00 62/115 |
| 2017/0343445 A1 | 11/2017 | Satou |
| 2020/0116406 A1* | 4/2020 | Schumacher ........... F04B 49/06 |

\* cited by examiner

METHODS AND SYSTEMS FOR PREVENTING PREMATURE COMPRESSOR FAILURE FROM IMPROPER OPERATION

FIELD

This disclosure relates generally to the control of a compressor. More specifically, the disclosure relates to methods and systems for detecting and correcting improper operation of a compressor in a refrigeration system and/or a heating, ventilation, and air conditioning (HVAC) system.

BACKGROUND

Many refrigeration systems and HVAC systems include a compressor that can compress refrigerant passing through a refrigerant circuit. In some instances, the compressor can be designed to rotate in a forward direction for fluid compression, and is not intended to rotate in a reverse direction during normal operation. If the compressor is operated in a reverse direction for a long period of time, the compressor could be damaged.

SUMMARY

This disclosure relates generally to the control of a compressor. More specifically, the disclosure relates to methods and systems for detecting and correcting improper operation of a compressor in a refrigeration system and/or an HVAC system.

Compressors are designed to rotate/spin/operate in a defined direction. The compressor can be a hermetic compressor. In some embodiments, the compressor can be a rotary compressor (for example, a rolling piston rotary compressor), a screw compressor, a reciprocating compressor, a swash plate compressor and/or a scroll compressor. By preventing spinning/rotating/operating of a compressor in a wrong/improper/reverse direction (hereinafter refer to "improper operation" or "operate in an improper direction" or the like), wear and damage to the compressor and/or to the refrigerant circuit can be prevented. A compressor may only be operated in an improper direction for a limited duration. If a compressor is operated in an improper direction for a long period of time, the operation can lead to premature failure of components of the compressor, even after the direction has been corrected.

The improper operation of the compressor may be due to various reasons. For example, when the compressor is driven by a three phase electrical machine (for example, an electric motor), there can be a potential of the compressor operating in an improper direction: e.g., the motor driving the compressor may operate in an improper direction if the phase commutation is incorrect. The incorrect phase commutation can be caused by installation issues (e.g., improper wiring, etc.) when a new compressor drive or a new compressor is installed. The incorrect phase commutation could also happen during manufacturing, service, operation, or an improper customer handling.

Operating the compressor in an improper direction may cause various types of damage. For example, in a refrigeration system and/or an HVAC system, lubricant such as oil may be required for lubrication of internal components. The lubricant can exist with the refrigerant. If the compressor is operated in an improper direction, the lubricant/refrigerant may spin in an improper direction, the lubrication may not occur, and/or the components may not get cooled. In another example, a compressor may rely on the mass flow of refrigerant for heat rejection. Improper operation of the compressor may cause minimal mass flow of refrigerant which may lead to excessive heat buildup within the components of the compressor. These types of damage can lead to an increase of the number of DPPM (defective parts per million) for compressors within a period of time, for example, 90 days.

The embodiments disclosed herein can prevent 90-day compressor failures (i.e. can reduce the 90-day DPPM) from, for example, incorrect compressor or compressor drive installation.

The methods and systems described herein can prevent the failure of the compressor throughout the lifespan of the compressor. For example, even if a factory has a check in place to ensure proper operation of the compressor during manufacturing, the methods and systems disclosed herein can prevent a future field issue/failure by, for example, detecting and correcting the improper operation of the compressor every time the compressor is started or re-started. Correcting and preventing the improper operation of the compressor can reverse a flow of a refrigerant passing through the refrigerant circuit. The refrigerant circuit can include, for example, an Electronic Throttle Valve (ETV), a compressor coupled to a condenser and an evaporator. The methods and systems disclosed herein can also store information associated with the improper operation of the compressor.

In one embodiment, a method for detecting and correcting an improper operation of a compressor of a refrigerant circuit is disclosed. The method includes starting the compressor by a compressor drive module. The method also includes upon starting the compressor, detecting whether the compressor is operating improperly by comparing a first measured sensor profile of a refrigerant circuit parameter and a previously stored start-up sensor profile. The first measured sensor profile tracks sensed values of the parameter over a first predetermined period of time. Also the method includes confirming operation of the compressor when it is detected that the compressor is operating improperly. Further, the method includes correcting operation of the compressor when it is confirmed that the compressor is operating improperly. Moreover, the method includes operating the compressor when it is detected that the compressor is operating properly.

In another embodiment, a method for detecting and correcting an improper operation of a compressor of a refrigerant circuit is disclosed. The method includes starting the compressor by a compressor drive module. The method also includes running the compressor for a predetermined period of time upon starting the compressor. Further, the method includes obtaining a computed torque profile of the compressor. The computed torque profile tracks a torque on the compressor over the predetermined period of time. Moreover, the method includes comparing the computed torque profile with a previously stored torque profile to determine whether the compressor is operating improperly. Also the method includes correcting operation of the compressor when it is determined that the compressor is operating improperly. The method further includes operating the compressor when it is determined that the compressor is operating properly.

In yet another embodiment, a system for detecting and correcting an improper operation of a compressor is disclosed. The system includes a compressor that compresses refrigerant directed through a refrigerant circuit. The system also includes a compressor drive module that drives the compressor. The system further includes a main controller that controls operation of the compressor drive module. Moreover, the system includes at least one sensor that is configured to sense at least one operational parameter of the system. The compressor drive module is configured to start the compressor. Upon starting the compressor, the main controller is configured to detect whether the compressor is operating improperly by comparing a first measured sensor profile of a refrigerant circuit parameter and a previously stored start-up sensor profile. The first measured sensor profile tracks sensed values of the parameter over a first predetermined period of time. The main controller also is configured to confirm operation of the compressor when it is detected that the compressor is operating improperly. The main controller is further configured to correct operation of the compressor, via the compressor drive module, when it is confirmed that the compressor is operating improperly. Moreover, the main controller is configured to operate the compressor, via the compressor drive module, when it is detected that the compressor is operating properly.

BRIEF DESCRIPTION OF THE DRAWINGS

References are made to the accompanying drawings that form a part of this disclosure and which illustrate embodiments in which the systems and methods described in this specification can be practiced.

Like reference numbers represent like parts throughout.

DETAILED DESCRIPTIONS

This disclosure relates generally to the control of a compressor. More specifically, the disclosure relates to devices, systems and methods for detecting and correcting improper operation of a compressor in a refrigeration system and/or a HVAC system.

Figure 1:
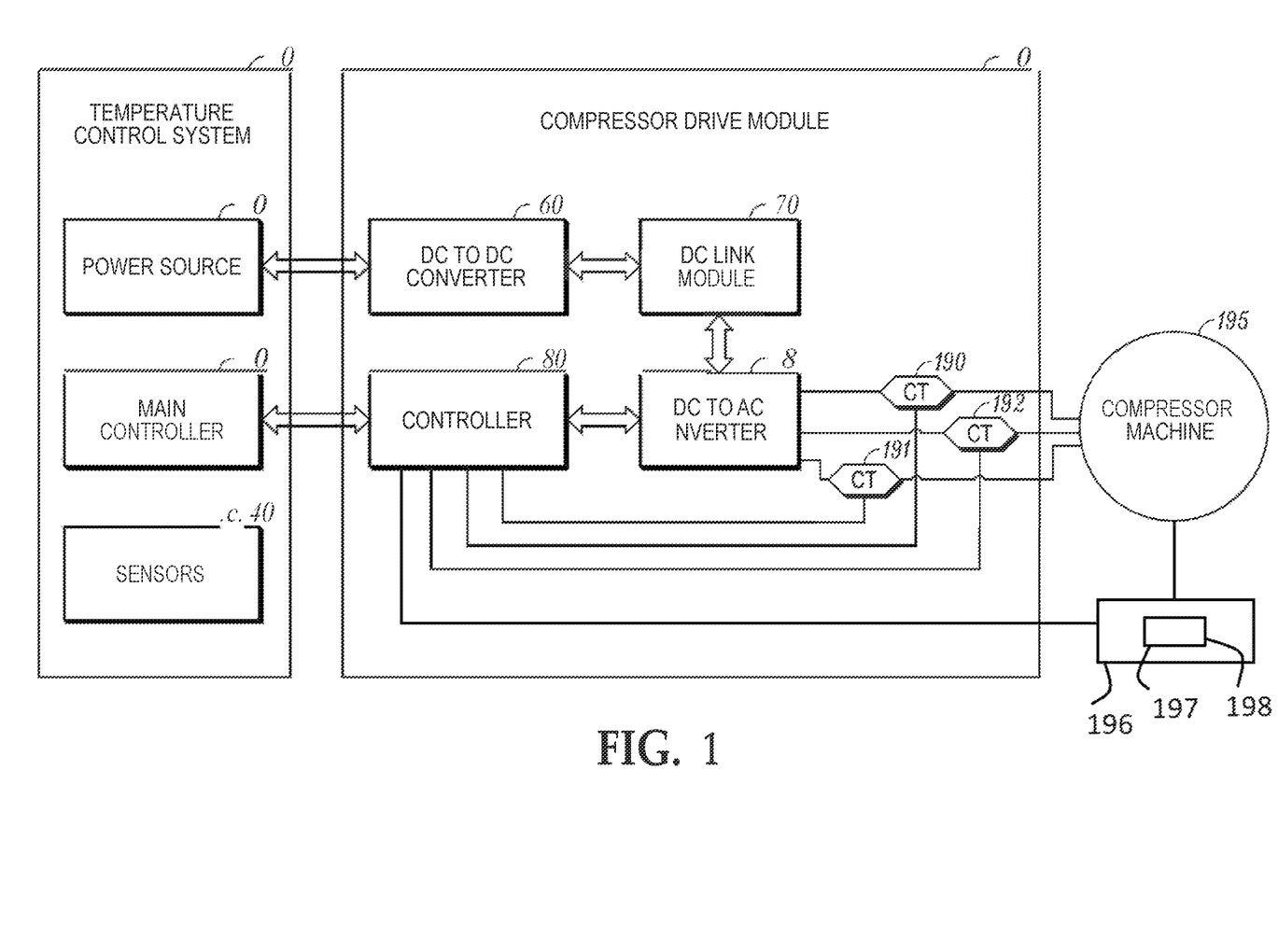
FIG. 1 is a schematic illustration of a system for detecting and preventing improper compressor operation in a temperature control system, according to some embodiments.

FIG. 1 is a schematic illustration of an improper compressor operation detection and prevention system 100 for detecting and preventing improper compressor operation in a temperature control system 110, according to some embodiments.

The system 100 can include the temperature control system 110, a compressor drive module 150, and the compressor machine 195. In one embodiment, the compressor drive module 150 can be a part of the temperature control system 110. In another embodiment, the compressor drive module 150 can be independent to the temperature control system 110.

The temperature control system 110 can be a refrigeration system and/or an HVAC system. The refrigeration system can be a transport refrigeration system (TRS). The temperature control system 110 can be a transport refrigeration unit (TRU) of the TRS. The temperature control system 110 includes a power source 120, a main controller 130, and a plurality of sensors 140. The main controller 130 can be a TRS controller of the TRU.

The compressor drive module 150 includes a DC to DC converter 160, a DC link module 170, a controller 180, a DC to AC inverter 185, and a plurality of current transducers or current sensors (190, 191, and 192). In one embodiment, the main controller 130 and the controller 180 can be the same. In another embodiment, the main controller 130 and the controller 180 can be independent to each other.

The compressor machine 195 can be a rotary compressor (for example, a rolling piston rotary compressor), a screw compressor, a reciprocating compressor, a swash plate compressor and/or a scroll compressor. In some embodiments, the compressor machine 195 can be an electrically driven compressor.

The power source 120 can provide an input direct current (DC) voltage to the DC to DC converter 160. The power source 120 can include, for example, a generator (e.g., three phase generator), an alternator (e.g., belt-driven alternator), a rectifier, an electric drive motor, etc. For example, a shore power source can provide alternating current (AC) electric power to a three phase generator of the power source 120, which in turn can direct DC electrical power to the DC to DC converter 160. In another example, a prime mover can provide mechanical power to a belt-driven alternator of the power source 120, which in turn can direct DC electrical power to the DC to DC converter 160. In yet another example, a three phase active electrical source can provide AC electrical power to a rectifier of the power source 120, which in turn can direct DC electrical power to the DC to DC converter 160.

The DC to DC converter 160 can convert the input DC voltage (for example, by boosting up the input DC voltage) from the power source 120 to an output voltage to the DC link module 170. The DC link module 170 can store the power obtained from the DC to DC converter 160 while the power is being converted back to AC power via the DC to AC inverter 185. The DC to AC inverter 185 can convert the voltage outputted by the DC to DC converter 160 to an AC voltage to drive the compressor machine 195.

In some embodiments, the DC to DC converter 160 can be optional. For example, when the power source 120 provides an adequate voltage to the DC link module 170, the DC to DC converter 160 might not be needed.

The plurality of current sensors (190, 191, and 192) can sense phase current of an output of the DC to AC inverter 185. Sensing can occur at any time, for example, during the startup or re-startup of the compressor machine 195. The electromagnetic torque of the compressor machine 195 can be estimated (e.g., calculated, computed, simulated, etc.), by the controller 180, based on the three-phase current sensed. The controller 180 can control or change the phase sequence of the output of the DC to AC inverter 185, to change an operation direction of the compressor machine 195 based on torque characteristics or toque profile of the compressor machine 195. A torque profile can be defined as a set of torque values over a period of time.

The main controller 130 communicates with the controller 180. The main controller 130 can monitor, communicate, and control each of the power source 120, the sensors 140, and each of the components of the compressor drive module 150. The plurality of sensors 140 can be one or more temperature sensors, pressure sensors, accelerometers, current sensors, etc. The plurality of sensors 140 can sense system parameters such as compressor/evaporator/condenser temperature, compressor suction and/or discharge pressure, compressor vibration/frequency and/or input electric current of the compressor to detect an operation direction of the compressor machine 195. The main controller 130 can, via the controller 180, control or change the phase sequence of the output of the DC to AC inverter 185, to change an operation direction of the compressor machine 195 based on sensor profile of the system parameters. A sensor profile can be defined as a set of sensor values over a period of time.

The detecting and correcting improper compressor operation can be performed at two levels: component level and system level. At the component level, the controller 180 can control the phase sequence of the output of the DC to AC inverter 185 to change an operational direction of the compressor machine 195 based on an estimated torque profile of the compressor machine 195 estimated from the current measurements from the current sensors 190-192. At the system level, the main controller 130 can control (or via the controller 180 to control) the phase sequence of the output of the DC to AC inverter 185 to change an operational direction of the compressor machine 195 based on a measured sensor profile of the system parameters obtained from the sensors 140.

The component level detection and prevention can be performed by the controller 180, the DC to AC inverter 185, and the plurality of current transducers (190, 191, and 192). It will be appreciated that in some embodiments the controller 180 and the main controller 130 can be the same. The system level detection and prevention can be performed by the main controller 130, the plurality of sensors 140, and the DC to AC inverter 185. It will be appreciated that in some embodiments the main controller 130 and the controller 180 can be the same.

Figure 2:
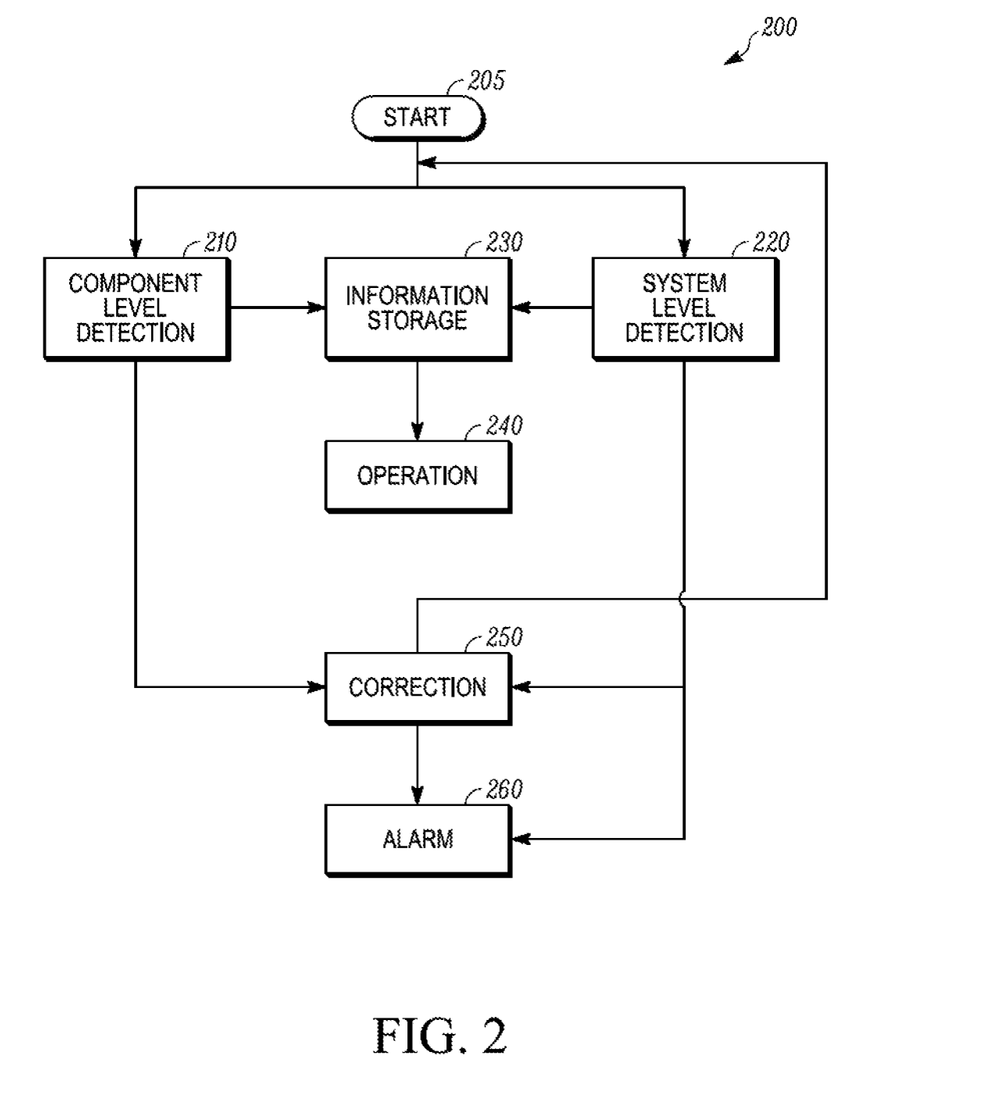
FIG. 2 is a flow chart of a method for detecting and preventing improper compressor operation, according to some embodiments.

FIG. 2 is a flow chart of one embodiment of a method 200 for detecting and preventing improper compressor operation using an improper compressor operation detection and prevention system such as the system 100 shown in FIG. 1. The method 200 begins at 205 when a compressor (e.g., the compressor 195 shown in FIG. 1) is started. The method 200 then proceeds to 210 and/or 220.

Figure 3:
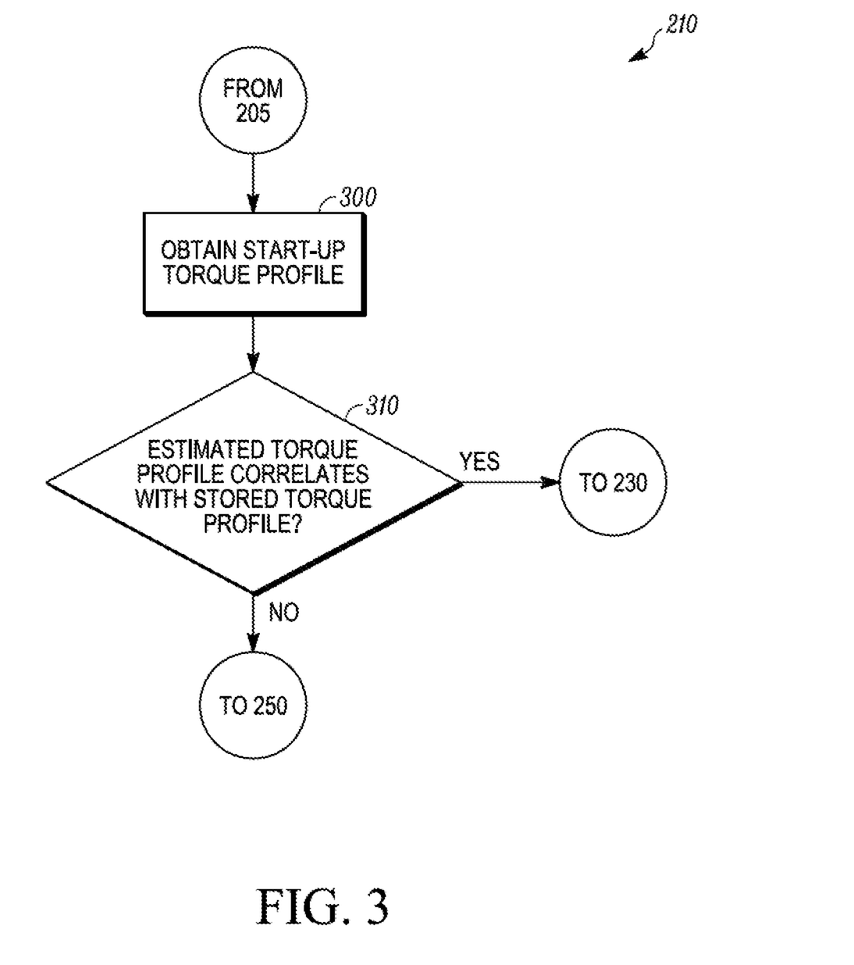
FIG. 3 is a flow chart of a method for detecting improper compressor operation at a component level, according to some embodiments.
Figure 4:
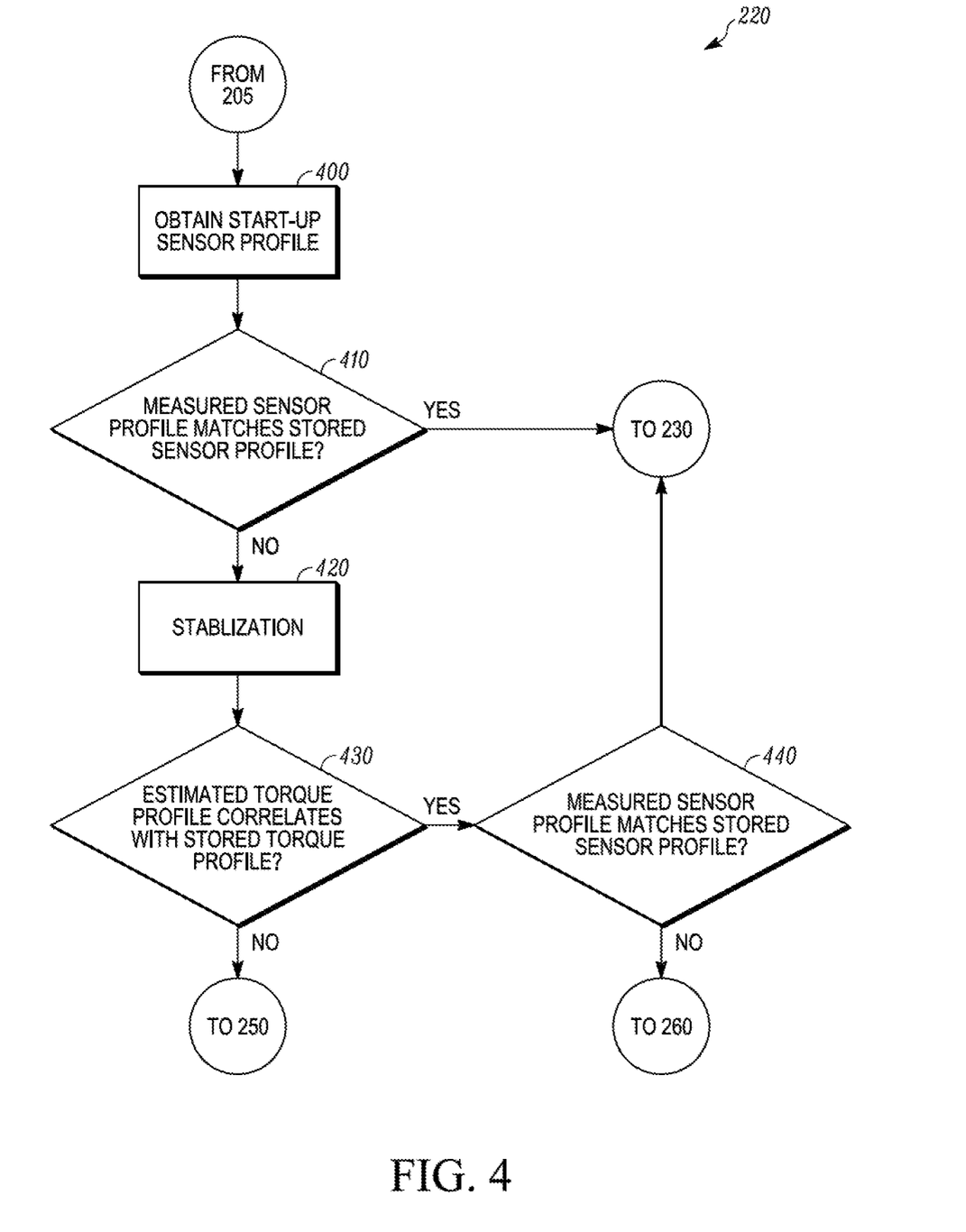
FIG. 4 is a flow chart of a method for detecting improper compressor operation at a system level, according to some embodiments.

At 210, a controller (e.g., the control 180 shown in FIG. 1) performs component level detection of the operation of the compressor. FIG. 3, discussed below, illustrates one embodiment of a component level detection of the operation of a compressor. At 220, a controller (e.g., the main control 130 shown in FIG. 1) performs system level detection of the operation of the compressor. FIG. 4, discussed below, illustrates one embodiment of a system level detection of the operation of the compressor.

The component level detection at 210 and the system level detection at 220 can be performed in parallel, in series, or individually. In some embodiments, the system level detection at 220 can be a backup for the component level detection at 210. In some embodiments, only when the component level detection at 210 fails will the system level detection at 220 be performed as a backup. In other embodiments, regardless of whether the component level detection at 210 fails or not, the system level detection at 220 will be performed as a confirmation. In some embodiments, the component level detection at 210 can be performed without the system level detection at 220. In other embodiments, the system level detection at 220 can be performed without the component level detection at 210.

It will be appreciated that it can take less time for the component level detection at 210 to be completed than for the system level detection at 220 to be completed. For example, in some embodiments, the component level detection at 210, operation at 240 and/or alarm at 260 can occur before the system level detection at 220 is complete.

Figure 6:
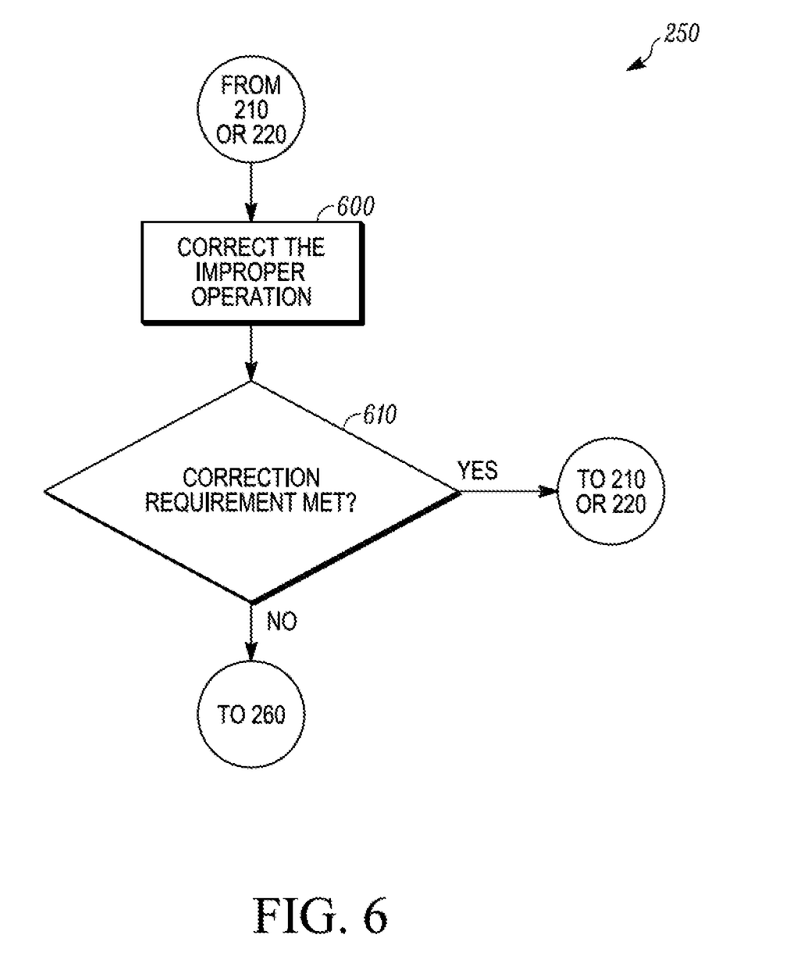
FIG. 6 is a flow chart of a method for correcting improper compressor operation, according to some embodiments.

The component level detection at 210 can detect whether there is an improper compressor operation. If the component level detection at 210 detects an improper compressor operation, the method 200 proceeds to 250 where correction of the compressor can be performed. FIG. 6, discussed below, illustrates one embodiment of correcting operation of the compressor. If a failure condition of the compressor is identified at 250, the method 200 proceeds to 260. If the failure condition of the compressor is not met at 250, the method 200 proceeds back to 210 or 220.

The system level detection at 220 can also detect whether there is an improper compressor operation. If the system level detection at 220 detects an improper compressor operation, the method 200 proceeds to 250 where correction of the compressor can be performed. FIG. 6, discussed below, illustrates one embodiment of correcting operation of the compressor. If a failure condition of the compressor is identified at 250, the method 200 proceeds to 260. If the failure condition of the compressor is not identified at 250, the method 200 proceeds back to 210 or 220. If a failure condition in the system level detection at 220 is identified, an alarm at 260 can be performed. If the failure condition in the system level detection at 220 is not identified, correction at 250 can be performed.

Figure 5:
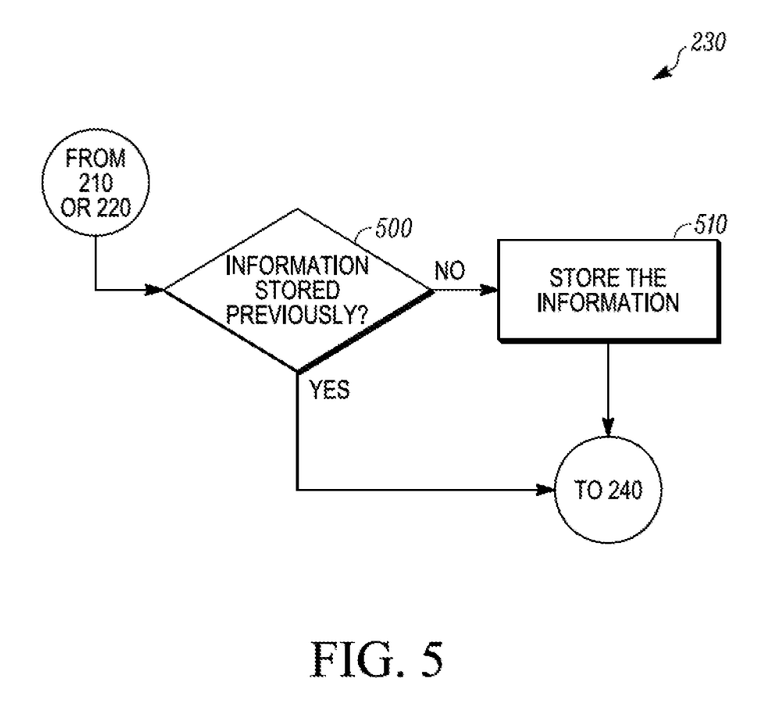
FIG. 5 is a flow chart of a method for storing an operational condition of a compressor, according to some embodiments.

If the component level detection at 210 and/or the system level detection at 220 does not detect an improper compressor operation (or the improper compression has been corrected/fixed at correction 250 and the subsequent component level detection 210 or system level detection 220 does not detect an improper compressor operation), the method 200 proceeds to 230 whereby information storage on the operation of the compressor can be performed. FIG. 5, discussed below, illustrates one embodiment of information storage on the operation of the compressor. The method 200 then proceeds to 240, where operation of the compressor can be performed to compress refrigerant directed through a refrigerant circuit of the refrigeration system and/or HVAC system.

It would be appreciated that the method 200 can be performed every time a compressor is started or restarted. In some embodiments, the system level detection at 220 can be a backup when the component level detection at 210 fails, or can be a confirmation when the component level detection at 210 is successful.

FIG. 3 is a flow chart of a method 210 for detecting improper compressor operation at a component level, according to some embodiments.

From 205, a compressor is started. The compressor can be driven by, for example, a three-phase electrical motor using the AC output from a DC to AC Inverter (for example, the DC to AC Inverter 185 in FIG. 1). The operation direction of the compressor can be determined by the phase sequence or phase commutation of the three-phase AC output from the DC to AC Inverter. If the motor is incorrectly connected, the operation of the compressor can be improper. The incorrect connection can be an issue especially when there is no easy means to ensure correct displacement of the phases, or when an application requires easy swap of the connecting terminals. To correct the improper operation of the compressor, the motor can be re-connected, or the phase sequence of the three-phase AC output from the DC to AC Inverter can be changed by a controller (for example, controller 180 in FIG. 1), for example, via a control software.

At 300, an estimated torque profile of the compressor is obtained. In some embodiments, at 300, a component level detection counter can be initialized, for example, to 0 during a system initialization process.

A torque profile (or the torque characteristics) is a set of electromagnetic torque values of the compressor over a predetermined period of time. The predetermined period of time can be, for example, a few (for example, less than 10) seconds; can be at about 10 to about 500 or more revolutions of the motor or the compressor depending on a start-up condition of the compressor, etc. In some embodiments, when synchronous machines/compressors are used, the startup can have a ramp up accelerating up to a predetermined speed. In some embodiments, when induction machines/compressors are used, the startup can have a ramp up accelerating up to a predetermined frequency. During a startup, the frequency of rotation of the motor or the compressor can be, for example, 1200 RPM (revolutions per minute). The torque values can be estimated, computed, or simulated by using the current values obtained or sensed from a three-phase AC output from the DC to AC Inverter (such as the DC to AC Inverter 185 shown in FIG. 1). The current values can be obtained or sensed by sensing the phase current of the AC output of the DC to AC inverter, by a plurality of current sensors (for example, sensors 190, 191, and 192 in FIG. 1). Thus, an estimated torque profile is a set of estimated torque values over the predetermined period of time. The set of estimated torque values is obtained by using the sensed current values from the plurality of current sensors. The method 210 then proceeds to 310.

At 310, the estimated torque profile during the start-up of the motor or the compressor is compared to a predetermined start-up torque profile. The predetermined start-up torque profile is the torque characteristics of the motor or the compressor operating in a proper operation during a normal start-up. The predetermined start-up torque profile can be obtained from testing or system simulation of the motor or the compressor, or from a previous start-up with a proper operation of the compressor. In some embodiments, the predetermined start-up torque profile can be obtained from testing and varying refrigerant load. If the estimated torque profile correlates with the predetermined start-up torque profile, the operation direction of the compressor is a proper direction.

The comparison of the two torque profiles can be performed in various ways including: comparing an average torque value of each torque profile with a predetermined torque threshold; comparing the areas (i.e. integration of torque over a predetermined period of time) covered by each torque profile; and/or comparing distances between certain torque points in each torque profile; etc. In some embodiments, a predetermined tolerance can be used during the comparison of the two torque profiles. When a compressor is operated in an improper direction, the estimated torque can be higher than the torque when the compressor is operated in a correct direction. When a compressor is operated in an improper direction, there can be specific ripple amplitude values (i.e. torque oscillations around a proper operation point) in the torque profile. When a compressor is operated in an improper direction, the speed of the compressor can be lower than the speed when the compressor is operated in a correct direction. In some embodiments, the alternative of comparison of the two torque profiles can be the comparison of two speed profiles (measured speed profile of the compressor and predetermined/stored speed profile).

If at 310, the estimated torque profile does not correlate the predetermined start-up torque profile, the operation direction of the compressor is an improper direction and the method 210 proceeds to 250.

If at 310, the estimated torque profile correlates the predetermined start-up torque profile, the operation of the compressor is proper (or was previously corrected/fixed at 250), the method 210 proceeds to 230.

In some embodiments, to enhance the compressor level detection, the motor or the compressor can be configured such that the improper operation can be detected by additional mechanical components 196. For example, the compressor can tap once a while (for example, every second) when the compressor is operated in an improper direction, and the controller monitors the taps. In another example, a seatbelt like feature can be added in the compressor so that if the compressor is operated in an improper direction the torque can be humped, and the controller monitors the bumps. In yet another example, the system can have a mechanical tracer 197. The mechanical tracer 197 can make a distinct signature in motor/compressor torque when the machine/compressor is operated in an improper direction. The mechanical tracer 197 can be a cog wheel 198 that tugs on the machine/compressor when the machine/compressor is operated in an improper direction. The mechanical tracer 197 can be added in the machine/corepressor. The controller can monitor the tugs within a predetermined period of time to determine an improper direction. If there is no taps, humps, and/or tugs, the machine/compressor is operated in a proper direction; if a predetermined number of taps, bumps, and/or tugs are detected by the controller, the machine/compressor is operated in an improper direction.

FIG. 4 is a flow chart of a method 220 for detecting improper compressor operation at a system level, according to some embodiments.

From 200, a compressor is started. The compressor can be driven by, for example, a three-phase electrical motor using the AC output from a DC to AC Inverter (for example, the DC to AC Inverter 185 in FIG. 1). The operation direction of the compressor can be determined by the phase sequence or phase commutation of the three-phase AC output from the DC to AC Inverter. If the motor is incorrectly wired or connected, the operation of the compressor can be improper. To correct the improper operation of the compressor, the motor can be re-connected, or the phase sequence of the three-phase AC output from the DC to AC Inverter can be changed by a controller (for example, controller 180 or main controller 130 in FIG. 1), for example, via a control software.

At 400, a measured sensor profile of the system can be obtained. In some embodiments, at 400, a system level detection counter can be initialized, for example, to 0 during a system initialization process.

A plurality of sensors (for example, sensors 140 in FIG. 1) such as temperature sensors, pressure sensors, accelerometers, and/or current sensors can sense system parameters such as temperature, pressure, vibration/frequency and/or current. A sensor profile can be defined as a set of sensed values (temperature, pressure, vibration/frequency and/or current) over a predetermined period of time. The temperature sensor can sense, for example, the compressor, the condenser, and/or the evaporator temperature. The pressure sensor can sense, for example, compressor suction and/or discharge pressure. The accelerometer can sense, for example, special vibration or frequency from the compressor. The current sensor can sense, for example, the current from the motor or the compressor. The differences in and/or the characteristics of the values of the system parameters over a period of time could be used to detect an operation of the motor or the compressor. For example, when the compressor is operated in an improper direction, there could be no refrigerant being pumped into the system, the evaporator coil would not get cold, and the temperature delta across the evaporator coil can be used to detect the operational direction of the compressor. In another example, when the compressor is operated in a proper direction, the compressor discharge pressure should be higher than the compressor suction pressure. In yet another example, when the compressor is operated in an improper direction, a compressor abnormal vibration profile can be correlated to the improper operation of the compressor.

Some system parameters such as temperature and/or pressure may need time to build up differences. For example, it may take for example, about or more than 30 seconds, depending on system state, to build up a temperature difference that is sufficient to detect an operation direction of the motor or the compressor. At 400, the time to obtain a measured (temperature, pressure, vibration/frequency and/or current) sensor profile of the system would typically longer than the compressor level detection and correction. Thus, the compressor level detection and correction may be used as a primary detection and correction of improper operation of the compressor, and can prevent not only catastrophic damages to the compressor, but can also prevent wear and other damages to the compressor due to improper operation within a few seconds, so that the 90-day DPPM can be reduced and the compressor lifetime can be extended.

The predetermined period of time to build up a sensor profile during a start-up of the motor or the compressor can be, for example, about or more than 30 seconds, depending on system state, such as previous refrigeration system state. A measured sensor profile can be a set of sensed system parameter values over the predetermined period of time from the plurality of sensors. The sensed system parameter values can be sensed temperature, sensed pressure, sensed vibration/frequency and/or sensed current, or any combination of these system parameters.

At 410, the measured sensor profile (sensed system parameters such as temperature, pressure, vibration/frequency and/or current during the start-up of the motor or the compressor) is compared to a predetermined start-up sensor profile. The predetermined start-up sensor profile is the characteristics of the system parameters when the motor or the compressor is operated in a proper direction during a normal start-up. The predetermined start-up sensor profile can be obtained from testing or system simulation of the system, or from a previous start-up with proper operation of the compressor. If the measured sensor profile matches the predetermined start-up sensor profile, the operation of the compressor is proper. The comparison of the two sensor profiles can be performed in various ways, for example, comparing an average sensor value of each sensor profile with a predetermined sensor threshold; comparing the areas (i.e. integration of sensor over a predetermined period of time) covered by each sensor profile; and/or comparing distances between certain sensor value points in each sensor profile. In some embodiments, a predetermined tolerance can be used during the comparison of the two sensor profiles.

At 410, if the measured start-up sensor profile does not match the predetermined start-up sensor profile, the operation of the compressor might be improper; method 220 proceeds to 420.

At 420, the compressor keeps running for another predetermined period of time (stabilization period, which is for example, at about 30 seconds, depending on system state such as previous refrigeration system state) so that the compressor can be in a steady state. After the stabilization period, method 220 proceeds to 430 and/or 440 to confirm/double-check the improper operation identified at 410 to rule out transient conditions (i.e. whether the improper operation identified at 410 is an outlier or a trend). The frequency of rotation of the motor or the compressor after being stabilized can be, for example, 3600 RPM.

During or after the stabilization period, a measured stabilization torque profile (i.e. torque characteristics of the compressor during or after the stabilization period, which can be different from the measured start-up torque profile at 300 in FIG. 3) and a measured stabilization sensor profile (which can be different from the measured start-up sensor profile at 400) can be obtained.

At 430, the measured stabilization torque profile can be compared to a predetermined (or stored) stabilization torque profile. If the measured stabilization torque profile does not correlate the predetermined stabilization torque profile, which can be an indication that the improper operation identified at 410 is confirmed, method 220 proceeds to 250.

At 430, if the measured stabilization torque profile correlates the predetermined stabilization torque profile, which can be an indication that the improper operation identified at 410 might be an outlier, method 220 proceeds to 440.

At 440, the measured stabilization sensor profile is compared to a predetermined (or stored) stabilization sensor profile. If the measured stabilization sensor profile does not match the predetermined stabilization sensor profile, which can be an indication that there is inconsistency between the comparison results at 430 and the comparison results at 440, method 220 proceeds to 260. If the measured stabilization sensor profile matches the predetermined stabilization sensor profile, which can be an indication that both the comparison results at 430 and the comparison results at 440 confirm that the comparison result at 410 is an outlier (i.e. a transient condition), method 220 proceeds to 230.

If at 410, the measured sensor profile matches the predetermined start-up sensor profile, which can be an indication that the operation of the compressor is proper (or was corrected/fixed at 250), method 220 proceeds to 230.

It will be appreciated that obtaining the measured stabilization torque profile and comparing two stabilization torque profiles can be the same or similar to obtaining the measured start-up torque profile and comparing two start-up torque profiles described in FIG. 3.

FIG. 5 is a flow chart of a method 230 for storing an operational condition of a compressor, according to some embodiments.

At 500, if an operational information or condition of the compressor or the system has been stored previously, the method 230 proceeds to 240.

At 500, if an operational information or condition of the compressor or the system has not been stored previously, the method 230 proceeds to 510. At 510 a controller (for example, controller 180 or main controller 130 in FIG. 1) stores the operational information or condition or any relevant information of the compressor (for example, evidence that a compressor has been operated in an improper direction, the present operational direction of the compressor, the present timestamp, and/or how many times the motor or the compressor has been in improper operation over its lifetime). The method 230 then proceeds to 240.

In some embodiments, to determine whether an operational information or condition of the compressor or the system has been stored, a check can be performed on whether an "improper direction detected" flag is set, for example, at 250 (discussed below). At 510, the flag can be cleared.

FIG. 6 is a flow chart of a method 250 for correcting improper compressor operation, according to some embodiments. The method 250 begins from 210 or 220 from FIG. 2 and proceeds to 600.

At 600, the compressor is stopped; the operational direction of the compressor (for the subsequent re-start) is reversed by changing the phase sequence of the three-phase AC output from the DC to AC Inverter by a controller (for example, controller 180 for component level correction or main controller 130 for system level correction in FIG. 1); the motor or the compressor is re-started in the reversed operation direction. In some embodiment, an "improper direction detected" flag or the like can be set. It will be appreciated that the flag can have an initialized value during a system initialization process. In some embodiment, the component level detection counter and/or the system level detection counter can be increased by one. It will be appreciated that processes in 600 can be performed in parallel or in series, and if in series, in any order. The method 250 then proceeds to 610.

At 610, a correction requirement is checked. The correction requirement can be a failure condition of the compressor or the system. In some embodiments, the correction requirement can be that the component level detection counter should be less than a predetermined counter M (for example, in a range from 1 to 10). In some embodiments, the correction requirement can be that the system level detection counter should be less than a predetermined counter N (for example, in a range from 1 to 10, such as 5). In some embodiments, the correction requirement can be that the component level or system level detection and prevention process should be less than a predetermined period of time.

At 610, if the correction requirement is not met, the method 250 proceeds to 260. If the correction requirement is met, the method 250 proceeds to 210 or 220.

As discussed above, the estimated torque profile can be obtained: over a few (for example, less than 10) seconds; at about 10 to about 500 or more revolutions of the motor or the compressor depending on a start-up condition of the compressor, etc. . . . During a startup, the frequency of rotation of the motor or the compressor can be, for example, 1200 RPM (revolutions per minute). In some embodiments, the predetermined counter M can be set to for example, 5. The time to detect an improper operation of the motor or the compressor can be completed within, for example, a half second to 5 seconds. Detection and prevention at the component level can enable the system to detect, correct, and/or prevent the improper operation of the motor or the compressor as quickly as possible so that the compressor's operation period in improper direction can be minimized and wear and damages to the compressor can be minimized.

Returning to FIG. 2, at 240, a controller (for example, controller 180 for component level correction or main controller 130 for system level correction in FIG. 1) can operate the motor or the compressor in the current proper (or corrected/fixed) direction in order to compress refrigerant passing through the refrigerant circuit.

At 260, a controller (for example, the controller 180 for component level correction or the main controller 130 for system level correction in FIG. 1) performs various tasks such as stopping the compressor, notifying a user, recording the failure, and/or setting an alarm. The controller can store and report information about the system level failures, and/or information about the component level detection, if any to the customer, the operator, etc.

ASPECTS

It is to be appreciated that any of aspects 1-6 can be combined with any of aspects 7-10. It is also to be appreciated that any of aspects 7-10 can be combined with any of aspects 11-16.

Aspect 1. A method for detecting and correcting an improper operation of a compressor of a refrigerant circuit, the method comprising:
  starting the compressor by a compressor drive module;
  upon starting the compressor, detecting whether the compressor is operating improperly by comparing a first measured sensor profile of a refrigerant circuit parameter and a previously stored start-up sensor profile, the first measured sensor profile tracking sensed values of the parameter over a first predetermined period of time;
  confirming operation of the compressor when it is detected that the compressor is operating improperly;
  correcting operation of the compressor when it is confirmed that the compressor is operating improperly; and
  operating the compressor when it is detected that the compressor is operating properly.

Aspect 2. The method according to aspect 1, wherein correcting operation of the compressor includes:
  stopping the compressor by the compressor drive module;
  reversing an operation direction of the compressor by the compressor drive module; and
  re-staring the compressor in the reversed operation direction.

Aspect 3. The method according to any of aspects 1 and 2, wherein operating the compressor includes:
  storing an operational information of the compressor in the memory of the compressor drive module; and
  operating the compressor to compress refrigerant directed through the refrigerant circuit.

Aspect 4. The method according to any one of aspects 1-3, wherein confirming operation of the compressor includes:
  running the compressor for a second predetermined period of time;
  comparing a computed torque profile with a previously stored torque profile to determine whether the compressor is operating improperly after the second predetermined period of time, the computed torque profile tracking a torque on the compressor over the second predetermined period of time; and
  conducting a sensor confirmation when it is determined that the compressor is operating properly after the second predetermined period of time.

Aspect 5. The method according to any one of aspects 1-4, wherein conducting the sensor confirmation includes:
  comparing a second measured sensor profile of the refrigerant circuit parameter and a previously stored stabilization sensor profile to determine a sensor mismatch, the second measured sensor profile tracking sensed values of the parameter over the second predetermined period of time;
  operating the compressor to compress refrigerant directed through the refrigerant circuit when it is determined that sensor matches; and
  generating an alarm when it is determined that sensor mismatches.

Aspect 6. The method according to any one of aspects 1-5, wherein generating the alarm includes:

recording an operational condition of the compressor;
stopping the compressor by the compressor drive module; and
generating an alarm to notify a user.

Aspect 7. A method for detecting and correcting an improper operation of a compressor of a refrigerant circuit, the method comprising:
starting the compressor by a compressor drive module;
running the compressor for a predetermined period of time upon starting the compressor;
obtaining a computed torque profile of the compressor, the computed torque profile tracking a torque on the compressor over the predetermined period of time;
comparing the computed torque profile with a previously stored torque profile to determine whether the compressor is operating improperly;
correcting operation of the compressor when it is determined that the compressor is operating improperly; and
operating the compressor when it is determined that the compressor is operating properly.

Aspect 8. The method according to aspect 7, wherein operating the compressor includes:
storing an operational information of the compressor in the memory of the compressor drive module; and
operating the compressor to compress refrigerant directed through the refrigerant circuit.

Aspect 9. The method according to any of aspects 7 and 8, wherein correcting operation of the compressor includes:
stopping the compressor by the compressor drive module;
reversing an operation direction of the compressor by the compressor drive module; and
re-staring the compressor in the reversed operation direction.

Aspect 10. The method according to any one of aspects 7-9, further comprising:
detecting a failure condition of the compressor; and
generating an alarm when the failure condition is detected.

Aspect 11. A system for detecting and correcting an improper operation of a compressor, the system comprising:
the compressor that compresses refrigerant directed through a refrigerant circuit;
a compressor drive module that drives the compressor;
a main controller that controls operation of the compressor drive module; and
at least one sensor that is configured to sense at least one operational parameter of the system,
wherein the compressor drive module is configured to start the compressor;
upon starting the compressor, the main controller is configured to detect whether the compressor is operating improperly by comparing a first measured sensor profile of a refrigerant circuit parameter and a previously stored start-up sensor profile, the first measured sensor profile tracking sensed values of the parameter over a first predetermined period of time;
the main controller is configured to confirm operation of the compressor when it is detected that the compressor is operating improperly;
the main controller is configured to correct operation of the compressor, via the compressor drive module, when it is confirmed that the compressor is operating improperly; and
the main controller is configured to operate the compressor, via the compressor drive module, when it is detected that the compressor is operating properly.

Aspect 12. The system according to aspect 11, wherein when the main controller is configured to correct operation of the compressor via the compressor drive module:
the compressor drive module is configured to stop the compressor;
the main controller is configured to change a phase sequence of an AC output of the compressor drive module so that an operational direction of the compressor is reversed; and
the compressor drive module is configured to restart the compressor in the reversed operational direction.

Aspect 13. The system according to any of aspects 11 and 12, wherein when the main controller is configured to operate the compressor via the compressor drive module:
the main controller is configured to store an operational information of the compressor in the memory of the compressor drive module; and
the compressor is configured to compress refrigerant directed through the refrigerant circuit.

Aspect 14. The system according to any one of aspects 11-13, wherein when the main controller is configured to confirm operation of the compressor:
the compressor drive module is configured to run the compressor for a second predetermined period of time;
the main controller is configured to compare a computed torque profile with a previously stored torque profile to determine whether the compressor is operating improperly after the second predetermined period of time, the computed torque profile tracking a torque on the compressor over the second predetermined period of time; and
the main controller is configured to conduct a sensor confirmation when it is determined that the compressor is operating properly after the second predetermined period of time.

Aspect 15. The system according to any one of aspects 11-14, wherein when the main controller is configured to conduct the sensor confirmation:
the main controller is configured to compare a second measured sensor profile of the refrigerant circuit parameter and a previously stored stabilization sensor profile to determine a sensor mismatch, the second measured sensor profile tracking sensed values of the parameter over the second predetermined period of time;
the compressor drive module is configured to operate the compressor to compress refrigerant directed through the refrigerant circuit when it is determined that sensor matches; and
the main controller is configured to generate an alarm when it is determined that sensor mismatches.

Aspect 16. The system according to any one of aspects 11-15, wherein when the main controller is configured to generate the alarm:
the main controller is configured to record an operational condition of the compressor;
the compressor drive module is configured to stop the compressor; and the main controller is configured to generate an alarm to notify a user.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for detecting and correcting an improper operation of a compressor of a refrigerant circuit, the method comprising:
    operating the compressor by a compressor drive module;
    upon operating the compressor, detecting whether the compressor is operating in an improper direction by comparing a measured sensor profile of a refrigerant circuit parameter and a previously stored start-up sensor profile, the measured sensor profile tracking sensed values of the parameter over a predetermined period of time;
    stabilizing the compressor after comparing the measured sensor profile and the previously stored start-up sensor profile;
    during the stabilizing step, measuring a stabilization sensor profile;
    confirming whether the compressor is operating in the improper direction by comparing the measured stabilization sensor profile and a predetermined stabilization sensor profile;
    correcting operation of the compressor when it is detected that the compressor is operating in the improper direction, wherein correcting operation of the compressor includes adjusting an operation direction of the compressor by the compressor drive module; and
    operating the compressor when it is detected that the compressor is operating properly.

2. The method according to claim 1, wherein operating the compressor includes:
    storing an operational information of the compressor in a memory of the compressor drive module; and
    operating the compressor to compress refrigerant directed through the refrigerant circuit.

3. The method according to claim 1, further comprising:
    detecting a failure condition of the compressor; and
    generating an alarm when the failure condition is detected.

4. The method according to claim 3, wherein generating the alarm includes:
    recording an operational condition of the compressor;
    stopping the compressor by the compressor drive module; and
    generating the alarm to notify a user.

5. A system for detecting and correcting an improper operation of a compressor, the system comprising:
    the compressor that compresses refrigerant directed through a refrigerant circuit;
    a compressor drive module that drives the compressor; and
    a controller that controls operation of the compressor drive module,
    wherein the compressor includes a mechanical component,
        the compressor drive module is configured to operate the compressor;
        upon operating the compressor, the controller is configured to detect whether the compressor is operating in an improper direction by monitoring the mechanical component;
        the controller is configured to correct operation of the compressor, via the compressor drive module, when it is detected that the compressor is operating in the improper direction; and
        the controller is configured to operate the compressor, via the compressor drive module, when it is detected that the compressor is operating properly,
    wherein the mechanical component is a mechanical tracer, when the compressor is operating in the improper direction, the mechanical tracer of compressor is configured to add a signature in a torque, and the controller is configured to monitor the signature of the torque.

6. The system according to claim 5, wherein when the controller is configured to correct operation of the compressor via the compressor drive module, the controller is configured to adjust an operational direction of the compressor.

7. The system according to claim 5, wherein when the controller is configured to operate the compressor via the compressor drive module:
    the controller is configured to store an operational information of the compressor in a memory of the compressor drive module; and
    the compressor is configured to compress refrigerant directed through the refrigerant circuit.

8. The system according to claim 5, wherein the controller is further configured to detect a failure condition of the compressor, and the controller is configured to generate an alarm when the failure condition is detected.

9. The system according to claim 8, wherein when the controller is configured to generate the alarm:
    the controller is configured to record an operational condition of the compressor;
    the compressor drive module is configured to stop the compressor; and
    the controller is configured to generate the alarm to notify a user.

10. The system according to claim 5, wherein the mechanical tracer is a cog wheel, when the compressor is operating in the improper direction, the cog wheel is configured to tug on the compressor, and the controller is configured to monitor tugs of the cog wheel.

11. The method according to claim 1, wherein correcting operation of the compressor is conducted via a control software.

* * * * *